US010628691B2

(12) United States Patent
Papineau et al.

(10) Patent No.: US 10,628,691 B2
(45) Date of Patent: Apr. 21, 2020

(54) STREAMLINED VEHICLE OCCUPANCY VERIFICATION UTILIZING CONFIRMATION (71) Applicants: Michel Papineau, East Toronto (CA); Mark Feltham, East Toronto (CA)

(72) Inventors: Michel Papineau, East Toronto (CA); Mark Feltham, East Toronto (CA)

(*) Notice: Subject to any disclaimer, the term of this patent is extended or adjusted under 35 U.S.C. 154(b) by 0 days.

(21) Appl. No.: 16/512,148

(22) Filed: Jul. 15, 2019

(65) Prior Publication Data
US 2019/0340453 A1 Nov. 7, 2019

Related U.S. Application Data (63) Continuation-in-part of application No. 15/789,503, filed on Oct. 20, 2017, now Pat. No. 10,354,458.

(51) Int. Cl.
H04W 24/00 (2009.01)
G06K 9/00 (2006.01)
G07B 15/06 (2011.01)

(52) U.S. Cl.
CPC ....... *G06K 9/00838* (2013.01); *G07B 15/063* (2013.01)

(58) Field of Classification Search
CPC .......................... G06K 9/00838; G07B 15/063
See application file for complete search history.

(56) References Cited

U.S. PATENT DOCUMENTS

| 2008/0175438 A1* | 7/2008 | Alves ............... G08G 1/0175 382/105 |
| 2011/0137773 A1* | 6/2011 | Davis, III .......... G01G 19/4142 705/34 |
| 2014/0180773 A1* | 6/2014 | Zafiroglu .......... G08G 1/0112 705/13 |
| 2017/0178416 A1* | 6/2017 | Barreira Avegliano ............... G07B 15/06 |

* cited by examiner

Primary Examiner — Justin Y Lee
(74) Attorney, Agent, or Firm — John L. Sotomayor (57) ABSTRACT The present invention is a method and system to verify carpool occupancy compliance for access to High Occupancy Vehicle (HOV) lanes, High Occupancy or Toll (HOT) lanes, or other vehicle-occupancy contingent rewards. The present invention uses software and hardware devices with radio-frequency transmitter modules to permit the "check-in" and "check-out" of individuals from a passenger compartment of a vehicle for particular trips for multiple passengers. The passengers are verified as occupying the same vehicle and tracked for each trip to validate the occupancy for any portion of a trip. The validation includes image comparison to determine that the individual a live individual and is the same at the start and end of the trip. Validation reports are provided to authorized users such as transport authorities.

14 Claims, 7 Drawing Sheets

FIG. 7

STREAMLINED VEHICLE OCCUPANCY VERIFICATION UTILIZING CONFIRMATION

COPYRIGHT AND TRADEMARK NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever. Trademarks are the property of their respective owners.

CLAIM TO PRIORITY

This application claims under 35 U.S.C. § 120, the benefit of the application Ser. No. 15/789,503, filed Oct. 20, 2017, titled "Vehicle Occupancy Verification Utilizing Proximity Confirmation" which is hereby incorporated by reference in its entirety.

BACKGROUND

More and more Department of Transportation (DOT) jurisdictions seek to create incentives for carpooling such as access to High Occupancy Vehicle (HOV) lanes on public highways. Such HOV lanes permit use only when a vehicle is being used to transport multiple occupants. One of the challenges with dedicating a lane to such "carpooling", particularly in the introductory phase when there are not many carpoolers, is the resulting, and politically unpopular, increased congestion in the remaining, regular lanes.

To help mitigate this issue, many jurisdictions are introducing HOV lanes as High occupancy OR Toll (HOT) lanes to provide paid access to the lanes for single-occupant vehicles. While paid access to HOT lanes can be less democratic than access to lanes based solely upon occupancy, use of HOT lanes can be more politically acceptable. This is because overall traffic congestion resolution theoretically becomes self-regulating: some drivers will opt to pay a toll to access a reserved lane when congestion is high.

An additional carpooling incentive can take the form of access to private toll roads, with such access also being based upon paid admission. While carpooling can erode the profitability of toll highways, the availability of carpooling on private toll roads can help to alleviate overall traffic volume while simultaneously leading to lower road maintenance and lane expansion costs.

One of the biggest challenges in a municipality's introduction of a carpool lane is its being able to enforce a carpool occupancy requirement and, in the case of HOT lane access, knowing the identity of the party to be billed for single occupancy access. While technology exists to use photo confirmation to determine occupancy, these technologies often produce questionable confirmations that subsequently require human operator intervention post lane-access. Periodically, such technologies lead to incorrect billing, resulting in a costly and time-consuming review process.

Alternatively, drivers may employ transponder-based systems that require driver input prior to beginning a shared ride. Before approaching a verification point, a driver using a transponder system must remember to indicate carpool activity, usually by activating a switch on his transponder. In some cases the driver is required to switch off the transponder to force a "photo exception" to the existing transponder system. This reliance on driver input can lead to system failure in cases where a driver fails to timely or properly indicate carpool activity.

BRIEF DESCRIPTION OF THE DRAWINGS

Certain illustrative embodiments illustrating organization and method of operation, together with objects and advantages may be best understood by reference detailed description that follows taken in conjunction with the accompanying drawings in which.

DETAILED DESCRIPTION

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

The terms "a" or "an", as used herein, are defined as one, or more than one. The term "plurality", as used herein, is defined as two, or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically.

Reference throughout this document to "one embodiment", "certain embodiments", "an exemplary embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

References herein to "device" indicate electronic devices that include but are not limited to, a radio frequency (RF) transmitter, a mobile phone, a laptop, an electronic tablet, or any personal digital assistance device.

References to "verification" indicate an objective process for confirming user input to a device.

References to "validation point" indicate any physical location where a request for verification could logically be made.

References to "rewards" indicate special privileges or access to special privileges that result from successful verification of user input.

References to "photo" indicate a digital visual representation of a vehicle's passenger area.

References to "GPS" indicate reference to the Global Positioning System (GPS) space-based radio-navigation satellite array and associated technologies.

References to "riders" or "multiple riders" in a vehicle refers to 2, 3, or more riders depending upon the capacity of the vehicle.

Reference to "Driver Checkin" in a vehicle refers to the generation of a photo identification used for verification of a driver location that may be collected spontaneously or may be stored within a mobile device, a autonomous vehicle, or any device located within a vehicle that has a photographic storage capability and a wireless communications capability.

Urban and suburban dwellers often seek shared transportation options for reasons as diverse as economy in travel expenses, shared responsibility in vehicle operation, and human companionship during a commute. In metropolitan areas where traffic congestion is rife, local authorities often incentivize shared transportation options in order to relieve traffic congestion and reduce expensive road maintenance. Setting aside special travel lanes for multi-occupant "carpooling" vehicles is one such incentive that municipalities employ. Vehicles with certain established occupancies are permitted unfettered access to lesser-travelled High Occupancy Vehicle (HOV) or High Occupancy/Toll (HOT) lanes, theoretically minimizing travel delays due to traffic congestion. Such delay minimization is a coveted reward for those who choose to carpool.

Because of the desirability of designated HOV and HOT lane access, municipalities must adopt systems and procedures to track, prevent and manage abuse of such lane access. Existing systems of ensuring compliance with rules regarding High Occupancy lane access rely on self-reporting, photographic verification, or post-billing adjudication.

Drivers and riders who wish to carpool may not know of each other or may not share compatible commuting schedules. For instance, even if two commuters are aware of each other, a vehicle driven by Driver A and bound for mid-town at 6:00 am may not prove a suitable match for Rider B needing to arrive in mid-town at 6:00 pm. Consequently, a need exists for a system and method for verifying carpool compliance using software and hardware devices that permit "matchmaking" between suitable drivers and riders while confirming passenger proximity to a driver.

In an embodiment, the invention described herein is a mobile-device application that uses user interfaces and GPS software to provide a list of prospective drivers with known travel itineraries to any number of potential riders. Riders can flag drivers based upon criteria such as exactness of itinerary match and prior rider reviews of drivers. Drivers can accept or reject specific riders as matches.

In an embodiment, while transponders identify the vehicle, the RideFlag® system identifies vehicle occupancy and location. In an embodiment, the RideFlag® system confirms the presence of two or more occupants within a single vehicle when drivers and riders use the application on HOT lanes, even for free rides with no other incentive than access to the HOV/HOT lane toll free. The RideFlag® system provides the platform to collaborate with jurisdictions and Toll Highway operators to confirm occupancy.

In an exemplary embodiment, riders and drivers may use the RideFlag® application to establish carpools on an as-needed basis with no carpool registration required. The RideFlag® system is totally dynamic in that carpools are created and identified at the singular transaction level. In a non-limiting example, a carpool can exist for a single instance of a paired ride, as well as for other groups of riders and lengths of rides. The identification of the carpool is automatically known by the RideFlag® system. In this exemplary embodiment, the platform identifies the occupants, the route and time of access. The RideFlag® server may then publish this confirmation to each of the relevant highway operators immediately post the access, complementing the existing photo confirmation systems and eliminating the need for human confirmation for RideFlag® application users.

Once drivers and riders have accepted matches, each is notified of the location of the other through use of GPS data associated with the driver's and rider's mobile devices. Once drivers and riders are physically within one vehicle, the GPS data can be analyzed to verify co-location of the driver and rider(s).

In an embodiment, this co-location verification takes place at a temporal validation point, at which time the rider receives a push notification to share the GPS data on his device, giving evidence as to the physical location of the device. The driver's GPS coordinates are known to the application (app), since the driver keeps his app open for the duration of a trip. A first server compares the GPS data from both devices and if resulting comparison evidences co-location of devices, the co-location is considered to be verified. Additional physical location data may take the form of communications from smart device to smart device (such as a smart phone) through the use of one or more Nearby communication protocols, where such protocols may include, but are not limited to, Bluetooth, BLE, Zigby, or any other near field communication protocol.

A first server compares the GPS and/or other physical location data from all devices that are within a pre-set physical location of the smart device associated with the driver, and if resulting comparison provides evidence of the co-location of devices, the co-location is considered to be verified. Confirmation of such verified co-location can then be submitted to appropriate regulatory bodies for the doling of a reward, such as permitted HOV or HOT access, or permitted preferred parking, or other rewards that may be provided by the transportation authority or additional entities partnering with the transportation authority. The system in in its entirety is referred to as the RideFlag® application.

In an embodiment, the invention described herein is a method of verifying commuter vehicle occupancy by establishing communication between a server and one or more mobile devices, determining the physical locations of each of said mobile devices, verifying said mobile devices are co-located, determining whether said proximity conforms to one or more pre-determined values, delivering communications from the server to a secondary server (like one operated by or on behalf of a regulatory body), and delivering communications from the server to said mobile devices. Verification of vehicle occupancy may be affected through analysis of one or more photographic representations of the vehicle passenger compartment.

In an alternate embodiment of the invention, a system of verifying commuter vehicle occupancy is described. The system may include a user interface, a server having a processor in wireless communication with one or more mobile devices, and a software module operative to determine the physical locations of the mobile devices. In use, the server verifies co-location of the mobile devices, delivers communications from the server to a secondary server (like one operated by or on behalf of a regulatory body), and delivers communications from the server to a user interface display on any one of the mobile devices.

The system and method described herein identifies vehicle occupancy and location as a natural product of the RideFlag® transportation application. The application confirms the presence of two or more occupants when drivers and riders simply use the app to match prospective drivers with prospective riders. When used with respect to HOT or HOV lane access, RideFlag® provides the platform to collaborate with jurisdictions and Toll Highway operators to confirm vehicle occupancy. Additionally, the process herein disclosed may be used not only to provide verification for occupancy-based Toll-Reduction in Express Lanes, toll highways, bridges, tunnels and highway access, but also may form the instant and immediate verification for occupancy-based congestion pricing for each roadway for which occupancy-based tolls and other payments have been specified and approved.

In an alternative embodiment, the RideFlag® application may permit the use of free or discounted access to HOT lanes to vehicles in which there is only one verified person based upon special considerations. Such special considerations may include, but are not limited to, premium access based upon a specified number of paid uses of the HOT lane, special discounts for particular dates or times, a reward offered by the operator of the HOT lane, or any other special consideration defined by the authority operating the HOT lane. In a non-limiting example, a vehicle with a single driver may be permitted to use the HOT lane after accumulating 10 authorized uses of the HOT lane, meeting all conditions of such use. Additionally, an authority operating a HOT lane may permit use of the HOT lane to single driver vehicles, or vehicles that do not meet all of the conditions for use of a particular HOT lane, to users with a mobile device in the vehicle that has been certified as having a special premium established by the authority operating the HOT lane even though the user of the mobile device in the vehicle may not be the driver of the vehicle.

In an embodiment, an array of biometric techniques may be used to validate the number of occupants present in a vehicle. Non-limiting examples of biometric techniques may include facial count, which is provided in the system by a process defined as "FaceCount", and verification where each participant registers their individual face (face print signature) via the camera and is added to the ride. This technique may include a count of human faces "seen" in a prompted (relevant time/location stamped) photo validated by biometric human face determination and/or a count of human faces made by a system server based on system input other than an actual photograph. This collection of faces is assumed to be a continuous group as the vehicle passes through reward points. Whenever a rider leaves the carpool, which is accounted for in the Drop Rider process, a confirming photo is taken and the ride is marked as a carpool collection change where the total participants is decremented and the face is now removed from the collection.

In this embodiment, the RideFlag system ensures that the driver is not distracted by, for example, being asked to take a photo or give their phone to a passenger to take a photo while in the act of driving. The add/drop method as embodied in the verification and Drop Rider process steps provides a reliable history of the trip in which the system may confidently assume that the departing rider was with the carpool during the time up until any departure, given that the driver phone is used to manage the face collection, count, and verification. In this embodiment, the system may grant awards based on the collection of occupants. During the verification process, failure to take a confirming face signature when any occupant leaves the passenger compartment of the vehicle will consider that person as having never been in the carpool collection, affecting the rewards that may be awarded based upon occupancy verification. This non-limiting implementation is further discussed in a later section.

An additional biometric validation technique may utilize audio, where a count is made of distinct voices "heard" in response to audio prompts, the number and sources of such voices being validated by one or more biometric voice-distinction algorithms. In this non-limiting implementation the occupancy validation may consist of audio collected for each voice that is different in pitch, tonality, or other audio parameters to identify each voice as separate and distinct from each other voice. Additional biometric techniques, such as iris scanning, used strictly for determining a distinction between participant occupants are also contemplated as implementations of biometric verification techniques which may utilize images captured by a mobile device, by an in-car camera or other image capture device, an image capture device associated with a transponder, or any other image capture device associated with the individual passengers or vehicle in which the passengers are located. While use of biometric validation may be employed for many different reasons, it can be of singular help in the event that vehicle occupants do not carry smartphones or other suitable electronic devices. While this is often the case with young children, people of every age may elect not to continually carry smart devices, such as smart phones, at all times, and even those who do may elect to turn the smart devices off during transit.

In cases where RideFlag® determines that an extra level beyond smart device validation is required—such as when RideFlag® suspects one or more users may be mimicking an additional person by deploying multiple user profiles on additional devices without an actual human user present in the vehicle, biometric validation may be used to prevent users' "gaming" the system. Whenever biometric validation is deemed necessary, regardless of the reason, the instant innovation requires all occupants who intend to be counted in the occupancy count for verification to use the biometric method. Biometric techniques for occupancy verification provide avenues for multiple modes of occupancy verification without relying on any single technique.

In an embodiment, occupancy validation may be performed with a simple optical scan with dynamic occupancy count, a procedure typically performed at set geographical locations and/or certain times of the day, and/or upon lapse of a particular time interval in the users' trip. This method may require a front-seated passenger to take a "Selfie" shot (a photograph framed with at least the photographer in the resulting image) which shows the faces of all occupants of the vehicle, or separate shots showing each passenger in the vehicle and permitting a collection of distinct face signatures.

In an embodiment, occupancy validation may be performed via Facial Distinction. Such an embodiment would employ a Biometrics Engine to compare a Base Pattern with a Candidate Pattern, where each pattern is a template of biometric traits used to determine an individual. While a typical biometric model would output the probability that the Base Pattern and Candidate Pattern are a match, the RideFlag® model employs a biometric engine to determine the probability that the Base Pattern and Candidate Pattern are NOT a match. In this embodiment, the verification process may calculate the probability of Match between carpool formation and/or inclusion of new members through the indication that a new facial signature has been added to the passenger compartment, and at the end of each user's journey. Utilizing a wide-angle lens camera permits the camera in a transponder to serve as the collector of facial signatures for all occupants in a passenger compartment, although this should not be considered limiting. Upon calculating a Probability of Distinction above an acceptable threshold, the RideFlag® server may determine that vehicle occupancy is sufficient to reward the vehicle occupants with lane access or any other reward that is offered by the Toll Highway or other road operator.

The RideFlag® server can dynamically perform the straightforward task of identifying the count of human faces among those participants who are facing towards the camera, with or without actually transmitting a captured photo. In an embodiment, the system actively counts faces within a single facial image or from a group of images. The system collects image data as the camera focuses, prior to taking a photograph, and compares a frame with a subsequent frame to determine if the human head, or heads, framed in the image are moving relative to one another over time. To provide alternative assurance that captured images are of faces of real individuals within the passenger compartment, the system may as a user to smile, frown, or blink to confirm that they are real and actively located within proximity to the driver. This technique provides an accurate assessment of individuals located within a passenger compartment without physically transmitting a captured photo. The system server can measure a variety of metrics associated with the motion of each human head, and the facial signature associated with each human head either separately or together, to distinguish one human head from another, as each head is framed by the camera lens. The collected movement data is analyzed to show that the image frames individuals actively seated within the passenger compartment of a vehicle and not just images of individuals held up by other passengers or later pasted into the image data. This technique can be employed to prevent users from "fooling the system" by displaying a photograph in lieu of a live human face.

In alternate embodiments, occupancy validation may be performed using biometric data accumulated through other identifying scans in addition to one or more images stored and used for pre/post carpool validation, including but not limited to iris scanning, ear scanning, or hand and/or fingerprint scanning. In an embodiment, individually assigned facial signatures may also be used to trigger other application functionality, such as, in a non-limiting example, signing in to the passenger compartment of a particular vehicle. Alternatively, or in combination with the foregoing methods, occupancy validation may be performed through Voice Distinction, as previously described, whereby the idiosyncrasies of an individual occupant's voice, as transmitted to and determined by the RideFlag® server, serve as that occupant's unique identifier.

In an embodiment, each of the foregoing models for occupancy validation may be delivered within the RideFlag® application (app) utilizing the camera and microphone on the user's smartphone or other smart device. Alternatively, each model may be delivered as embedded software within other apps (as a software development kit for validation, and prompted by geolocation for rewards offered through the RideFlag® Rewards platform). Each model may be built into highway transponders with automatic verification of occupants, such a system utilizing a camera equipped with a wide-angle lens and dedicated chip for reporting human face count and the fact that the human face count is for distinct human faces that make up the total face count, utilizing an Infra-Red camera to evaluate distinct human heat signature in the confines of the vehicle, or utilizing a combination of an optical camera and an Infra-Red camera, when each of these cameras is either outside or inside the vehicle.

In an embodiment, validation for rider occupancy may also be performed through the use of facial signatures captured within a smart device associated with a driver. In this embodiment, the capture and use of facial signatures may be performed in combination with all biometric verification techniques herein presented. The facial signatures may be captured and stored within a smart device through the use of the camera or other image capture device integral to the smart device, a camera or other image capture device installed within and associated with an autonomous vehicle, or an image capture device associated with a transponder that is located within the vehicle the riders are using for transport. The verification of occupancy may be performed through the count of facial signatures that are established as being located within a preset distance of the driver during a journey, where the preset distance is the same as the physical area of a vehicle associated with the driver, indicating that the individual facial signatures are collocated with the driver within that vehicle. The verification of occupancy may also be performed through a simpler count of faces and/or heads where no stored facial signature may be required to perform this count and provide an occupancy verification based thereupon.

To initiate this process, the driver registers his facial signature on his smart device by utilizing the view finder of the camera integral to the phone. The view finder captures a mathematical description of the face of the driver, whether or not a photo is captured. This mathematical description is the facial signature for the driver that is stored in the smart device for later comparison and verification. The driver may then capture additional facial signatures for all other participants in a carpool or other individuals who may be located within the preset distance of a driver in a current journey or in future journeys.

In an alternative embodiment, the driver may utilize a driver checkin feature, where the driver has stored within a server or a mobile device a previously captured photographic image. The selection of the driver checkin feature permits the RideFlag® application to retrieve the driver's previously stored photograph and the mathematical description of the driver's facial signature from the server, mobile device, or other data repository where the driver photograph and facial signature have been previously stored. This option may be extended to passengers when the passengers have registered with the RideFlag® application and have provided a recent photograph of themselves. The RideFlag® application retrieves the passenger photograph and the passenger facial signature and "checks in" the passenger with the driver for the particular trip and for that particular vehicle. Allowing users, both drivers and passengers, to include their own picture for repeated "check-in" considerably reduces the time and effort required for drivers and passengers alike to validate the fact that they are co-located within a particular vehicle for a particular trip.

Once the check-in has been performed on a driver or passenger smart device, the check-in process does not have to be repeated as the smart device may contain a "friends list" into which the facial signature is stored. The driver and passengers are provisionally verified as occupying the vehicle for a particular trip through the check-in process step. As passengers depart the vehicle, or when requested at a validation point, a second photograph must be captured in real time by a camera and uploaded to the RideFlag® application server. The camera capturing the image may be associated with a mobile device, may be installed as an integral device within a vehicle, or may be captured by any stand-alone camera having a wireless communication capability. The photographic captured in real time is transmitted to the RideFlag® application server where the facial signature is developed. The developed facial signature and photograph may then be compared against the previously stored photograph and facial signature for that person. If the photographs and facial signatures match, the check-out process proceeds for the vehicle to update the occupancy of the vehicle and provide validation where appropriate. At the termination of a trip, or when requested at a validation point, the driver must capture a photographic image of him/herself. The photograph is processed to create a facial signature and the photograph and facial signature may be compared to provide validation of the identity of the driver. In this process, the validation utilizes a pre-stored image and facial signature for driver and passengers to compare against a newly captured image to provide the assurance of validation of occupancy of the vehicle.

In a non-limiting example of this process of proximity validation, a driver and one or more passengers may each have stored a photograph in the profile associated with the driver and each passenger. The profile for each person in the vehicle may be stored within a mobile device associated with each person, or the profile for each person may be downloaded from electronic data storage associated with the RideFlag® application server to the mobile device associated with each person. Validation may occur when the two mobile devices are brought together within near field communication proximity and the RideFlag® application server validates that there are two different pictures of individuals occupying the vehicle. In a non-limiting example, when the RideFlag® application server determines that the mobile devices associated with each person in the vehicle have increased their physical separation such that they are no longer identified as co-located, the physical separation may indicate the termination of a trip or carpool travel without further action on the part of the individuals, driver and passengers, having been previously validated as occupying the vehicle.

When a carpool action takes place utilizing the face count verification of occupancy, each participant in the carpool is accepted into that instance of a carpool by looking at the smart device associated with the driver or another user through a "check in" action. Looking at the smart device permits the smart device to capture the facial signature of the individual. The facial signature is then compared against the facial signatures in the "friends list" currently stored in the smart device. If the facial signature is recognized, the individual is added to that particular carpool journey. If the facial signature is not recognized, the driver or other user will be prompted to register the individual and place the newly captured facial signature into the "friends list" maintained on the smart device and add the individual to the instant carpool journey.

When a registered individual leaves the particular carpool journey prior to reaching the driver's final destination, the individual may be removed from the carpool journey at the point they leave the vehicle and are no longer within the preset physical distance from the smart device associated with the driver or other user through a "check out" action. As the individual members of the particular carpool journey leave the vehicle, either at the driver's destination or prior, the smart device maintains a record of the time and location of the departure of each facial signature, representing the individuals participating in the particular carpool journey, to create and manage the history of the carpool journey and the participants therein.

The driver, or other preselected user if the driver is not the manager of the particular carpool journey, may be responsible for all "check in" and "check out" actions for the duration of the carpool journey. The driver, or other user, may be motivated to comply with the "check in" and "check out" actions for the particular carpool journey because the rewards earned along the carpool journey will not be granted until the driver or other user has confirmed the occupancy of the vehicle by having each participant both "check in" and "check out" of the carpool journey. In this embodiment, all rewards will be held in suspension until occupancy is confirmed at the end of the carpool journey, regardless of when each individual "taps out" of the vehicle.

At the end of the trip, the RideFlag® application may randomly select and ask one or more of the individuals participating in the trip to take a separate photograph of themselves utilizing their own mobile device to validate that the person/picture in the profile picture matches the live person at check-out. This process allows riders to verify themselves on their own phone as compared to the picture they have put on file with us as their "Profile" photo, provides security and high reliability of verification even with photos of the same person taken years apart, and permits validation through the RideFlag® server that the person being identified is not the same as anyone else in the carpool for highly reliable validation results.

In a non-limiting example, the process of building the occupancy of the vehicle does not require that every participant in the carpool journey be present in the view frame at the same time. In this example, each face can be viewed and confirmed individually at the start of the trip, by "tapping in" while the vehicle is stopped. In a further non-limiting example, a Mom may scan the faces of each of her children prior to beginning the carpool journey and then scan the faces of her children when the vehicle has reached the journey termination point. This process may be used in combination with other occupancy verification methods to provide a secondary check of the vehicle occupancy.

In a non-limiting example, if the person being identified looks like someone else in the same carpool, the RideFlag® application may change to "twins' mode" on the driver phone, or one of the two phones that have the similar profile photographs. In this mode, there is no requirement for taking photo on someone else's phone. This mode also allows the RideFlag® application server to provide broader validation capability with automatic trip end detection as the phones separate geographically. The RideFlag® system may independently verify each user is still with their phone using each phone's internal validation. The RideFlag® application also allows for "check-out" random audit with a function that permits verifying that the number of individuals who checked in with the system is the same as the number of individuals that check out for the trip. The "check-out" process forms the determination of the departure of a mobile device from a particular vehicle and may consist of a geophysical distance separation greater than a pre-determined distance or a notification by a mobile device that the mobile device is exiting the particular vehicle. This validation may be performed randomly instead of at the end of every trip to minimize system usage. This process may also provide for higher participation by users who are registered users of the RideFlag® system and allows for reward distribution to registered passengers. Additionally, this process may overcome most the privacy concerns for utilization of processes of this type as registered users have granted permission to capture their own face on their own profile as terms of participation.

In an embodiment, an additional verification process step may include the detection of facial movement to ensure that a photographic or video image captured and provided for validation was captured by a real individual, and is not merely an additional digital representation of the individual. This verification process step utilizes facial movement to detect whether a photographic or video image provided for the "check-out" process is of a live person. In a non-limiting example, the process evaluates facial movement and when there is no or little movement detected, the RideFlag® application may ask the individual captured in the image to make a facial expression (e.g. smile, frown). The facial movement algorithm may then analyze the most recent captured image and isolate any face that is included in the image. The analysis then proceeds to determine if this image is different than the image provided upon "check-in", regardless of how the check in was performed for the individual. If the image shows a distinct difference from the check-in image for the individual, a non-validation message is generated. If the image is very similar to the image for another individual in the vehicle, further analysis may be utilized to validate the image against the stored facial signature by, in a non-limiting example, placing the two similar photos side by side in the same display to analyze differences directly. Upon completion of the analysis, if the facial signature plus image provide evidence that the image captured for the "check-out" function verifies not only the identification of the individual, but also that the individual is alive person, the the RideFlag® application sends a validation message to the server.

In an embodiment, while the RideFlag® application is designed to report occupancy count validation to the RideFlag® server and pass this information on to incentive providers, such as, in a non-limiting example, toll collectors and parking providers, to confirm benefit eligibility, the RideFlag® system may also partner with providers of complementary capabilities with whom the RideFlag® server may communicate to augment and extend the capabilities offered by such commercial partners. In a non-limiting example, the RideFlag® system may have an arrangement with a Transponder provider where the RideFlag® system server may communicate directly with the Transponder hardware and Transponder server such that the transponder can pass the occupancy confirmation to a toll operator or parking provider. In a non-limiting implementation, the RideFlag® system may replace the physical "switch" on a transponder to an acceptance of a RideFlag® system validation message and communicate that to the transponder.

Additionally, with the advent of highly automated, autonomous vehicles, the RideFlag® system validation message may be extended directly to the vehicle itself in the case of autonomous and connected vehicles. Future autonomous vehicles may have cameras installed in various locations within the vehicle, such as a camera with a wide-angle lens installed within the dashboard of a camera, or other cameras focused on the passenger compartment where the photographic and video imagery is captured by the autonomous vehicle either automatically or upon request of the passengers. Additionally, cameras may be provided as an integral component of a transponder itself. Profile photos selected from any source, including pictures previously stored on the user's phone, photographs captured by a transponder camera, photos or video imagery captured by one or more cameras installed within an autonomous vehicle, or from other imagery sources, may be used to compare against an individual's real time audit capture photo. In these non-limiting examples, the RideFlag® system may communicate directly to a transponder or other vehicle installed equipment which then communicates to a transponder server or other commercial or governmental agency to provide verification and authentication of individuals within the passenger compartment of a vehicle either in real-time or during later analysis of the RideFlag® system data.

Figure 1:
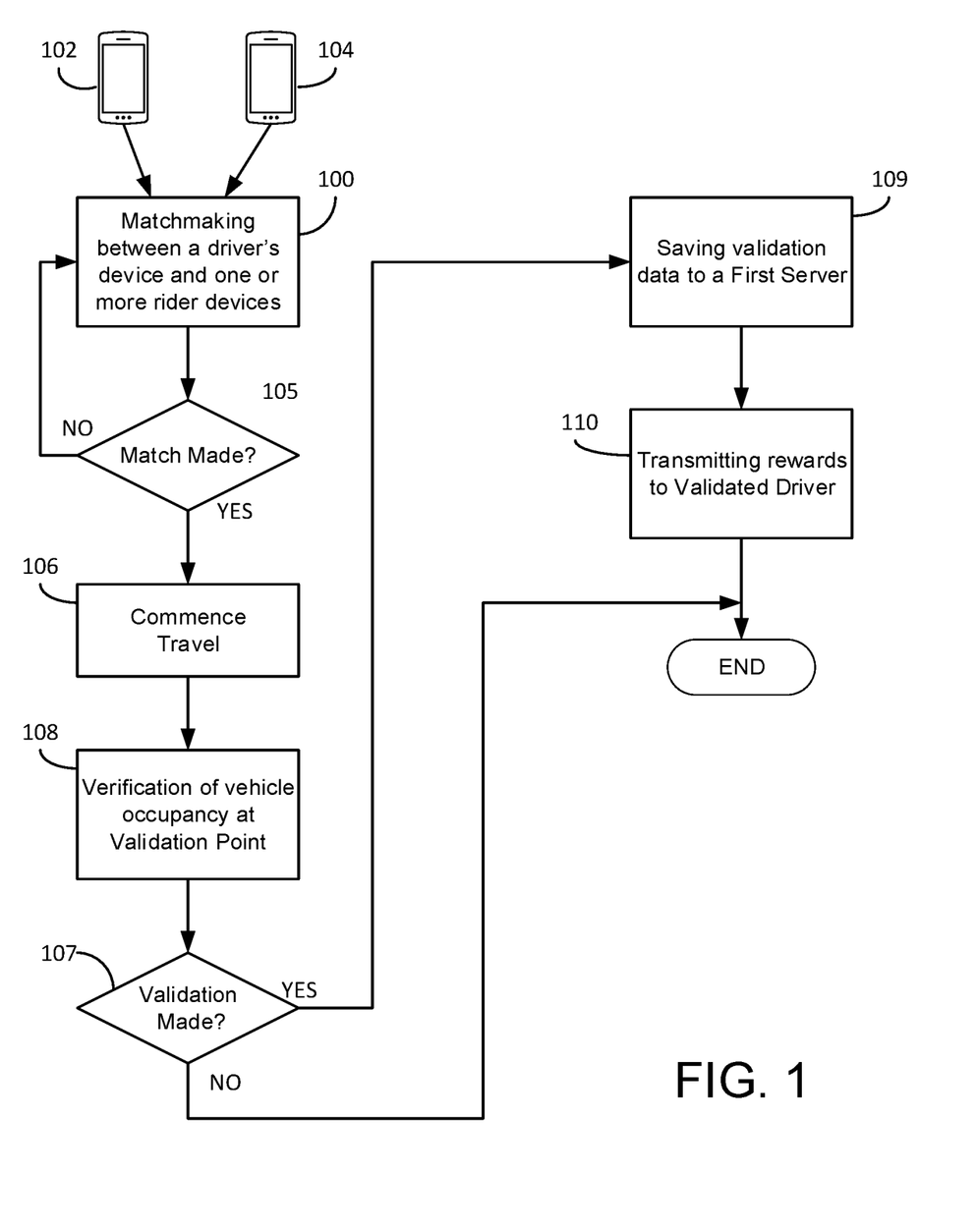
FIG. 1 is a system diagram for an exemplary system operation consistent with certain embodiments of the present invention.

Turning now to FIG. 1, a system diagram for an exemplary system operation consistent with certain embodiments of the present invention is shown. During matchmaking 100, driver's device 102 and rider's device 104 are paired based upon data provided by the users of the devices, such as destination, desired times of departure and arrival, and fee amounts. Once paired 105, driver's device 102 and rider's device 104 enter commence travel phase 106. Commence Travel phase 106 includes driver and rider meeting in physical space and beginning travel to a mutually-agreed upon destination. Upon reaching discrete validation points 108, driver's device 102 and rider's device 104 are triggered by a first server 109 to provide first server 109 with GPS coordinates to determine whether devices are co-located. If the devices associated with the driver and one or more riders are determined to be co-located at 107, and if first server 109 determines that reward requirements are met, first server 109 confirms reward status with second server (owned or controlled by the reward grantor, such as a regulatory agency, transportation authority, or a partner to these entities) and with at least driver's device 102. Upon confirmation of the reward status, rewards may be transmitted to a driver 110.

Figure 2:
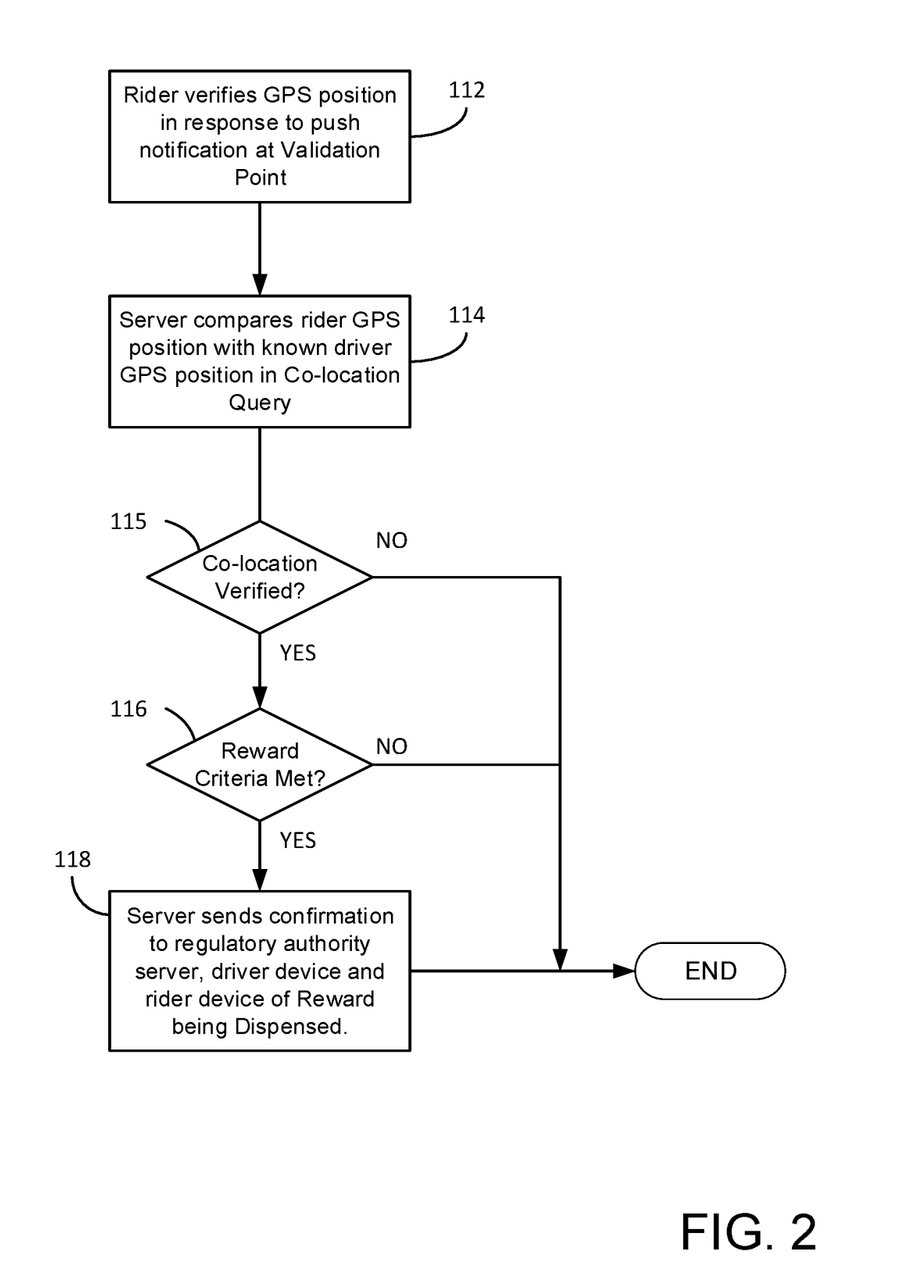
FIG. 2 is a process flow diagram for the determination of sufficiency of award criteria using mobile device GPS data and communication of same by server operation consistent with certain embodiments of the present invention.

Turning now to FIG. 2, a process flow for the determination of award criteria consistent with certain embodiments of the present invention is shown. In an embodiment, a rider verifies his GPS coordinates at a validation point 112. At 114, the system server compares rider's GPS coordinates to driver's known GPS coordinates. From this information, the server may determine if the driver and rider(s) are currently co-located 115. At 116, the server determines if the necessary reward criteria have been met. Most commonly, reward criteria would involve the number of occupants in a car associated with a time of day. The number of occupants in a car may be determined by the number of RF signals detected at a validation point, or by photo evidence provided by any one of the detected mobile devices associated with an RF signal that is collocated with the driver's mobile device. At 118, the server sends determination regarding satisfaction of reward criteria to the appropriate regulatory authority, transportation authority or partner, the rider(s), and the driver.

Figure 3:
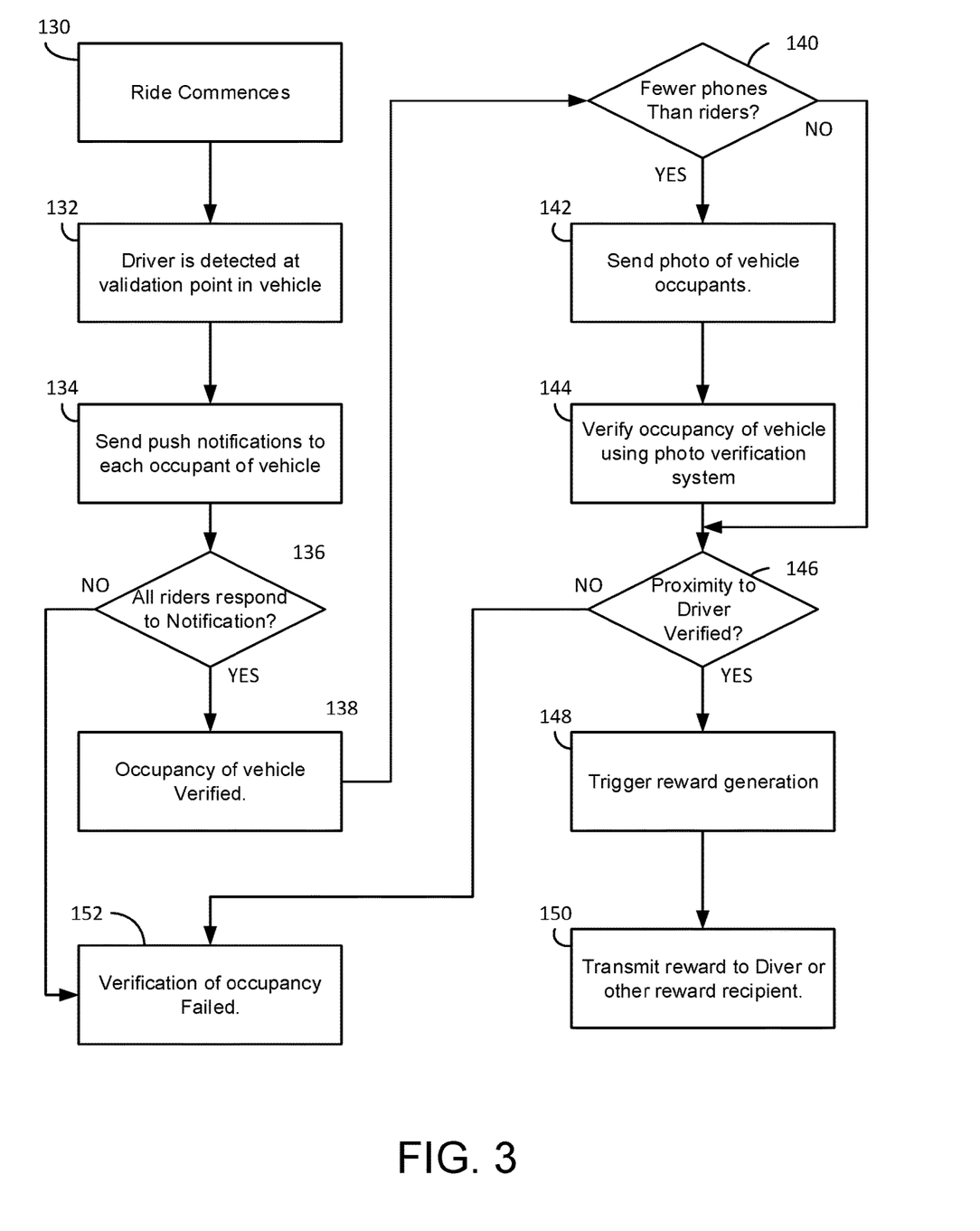
FIG. 3 is a process flow diagram for verification of vehicle occupancy consistent with certain embodiments of the present invention.

Turning now to FIG. 3, a process flow diagram for verification of vehicle occupancy is shown. In an embodiment, at 130, the ride commences, with the driver and rider beginning the trip to any reward point or rider destination. At 132, the driver's device comes within detection distance of a validation point which may then trigger a server request for verification of the number of car occupants. In a non-limiting example, such a validation point would typically be positioned immediately prior to HOV or HOT lane access. In the case where the reward is a preferred parking spot instead of special lane access, the validation point may be positioned at a parking lot entrance or parking garage entrance.

In an embodiment, at 134, in cases where the number of RF transmitter-equipped devices (i.e.: smartphones, or other RF transmitting devices) equals the number of individuals collocated in a vehicle, which includes the driver and all riders, the first server sends a push notification to each individual to respond with GPS coordinates of the location of each RF transmitter-equipped device. This response from each individual permits the RideFlag® server to determine their proximity to the driver of the vehicle. The primary method of verification utilizes peer-to-peer proximity detection to verify the proximity of a driver mobile device with all mobile devices associated with riders, however, in a non-limiting example, the driver phone maintains validation status that the rider phones are still nearby and reports the carpool occupancy count each time the carpool composition changes (changes occur when new occupants are added or when existing occupants are no longer detected). When a rider is no longer detected, the RideFlag® may take steps to notify the driver that it "appears" the rider has left and asks the driver to confirm, if the driver claims the rider is still nearby, the RideFlag® server then sends a push notification to the rider as a backup to a proximity failure.

At 136, if all respondents are determined to be within a set distance that indicates they are close enough to the driver that they are within the driver's vehicle, the RideFlag® system may verify that the occupancy requirements have been met for the driver's vehicle 138. These responses provide for the verification of the number of riders within the vehicle and provide a verification step for occupancy in the vehicle. In an embodiment, at 140, in cases where the number of RF transmitter-equipped devices is smaller than the number of riders, a different method of verification may be required. This step actually occurs whenever a driver loses the peer-to-peer connection with one or more riders. Driver phone is notified that the rider appears to have left the vehicle (this can occur if the riders phone dies, or if the rider turns off WiFi, Internet and BLE simultaneously). Failure to re-establish peer-to-peer connection will result in our records reflecting the rider departure point as the last known point that he was confirmed to be near the driver—the transport authority's policy will determine if the reward is still granted or not.

In this exemplary embodiment, one of the riders (passengers) may be instructed to send a photo of vehicle occupants time-stamped with the time of the driver's device that triggered the verification request at the encountered validation point 142. Uploading the time-stamped photo to the server permits the photo verification of the number of occupants in a vehicle utilizing existing photo verification systems 144. The server may utilize the photo verification of the occupants of the vehicle to provide the occupancy verification step for the vehicle.

In this exemplary embodiment, at 146, if the first server determines that the driver and the riders have met occupancy requirements by verifying the proximity of each occupant to the driver of the vehicle, a reward may be triggered 148. If the first server determines that the driver and riders have failed proximity requirements, a failure notice is triggered. If the reward grantor suspects that the driver has falsified the proximity requirements the server may label this action as "cheating" the system. In a non-limiting example, and not by way of limitation, one condition the server may label as "cheating" may be using multiple phones not associated to physical individuals to attempt to establish that there are an equal number of RF-transmitting devices and individuals collocated within a single vehicle. If the server determines that an action or activity that may be labeled as "Cheating" has occurred, the server may require the performance of a dual validation activity, such as requiring both GPS push notification responses and photo identification. At 146, the server performs dual validation with post-event reply requests during a time interval when it would be unlikely or illogical for two or more devices associated with separate, physical individuals to be co-located.

At 150, if the reward grantor is satisfied that that the occupancy of the vehicle has been properly verified, and that the driver is not "cheating" in some fashion, the reward grantor may then transmit the reward certificate, notification, validation, or permission to the driver of the vehicle.

Figure 4:
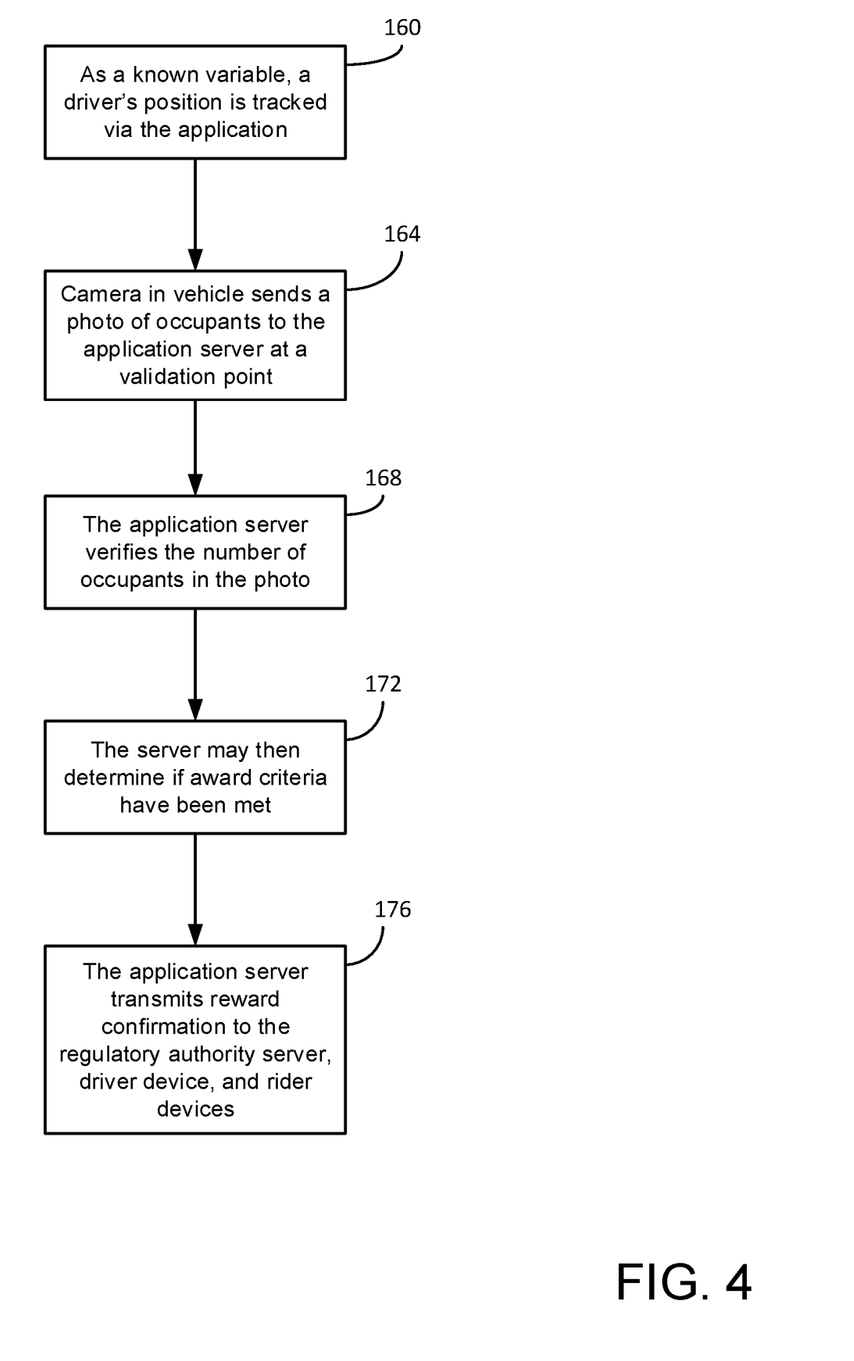
FIG. 4 is a process flow diagram for the determination of sufficiency of award criteria using one or more mobile device digital images and communication of the same by server operation consistent with certain embodiments of the present invention.

Turning now to FIG. 4, a process flow for an alternate determination of award criteria consistent with certain embodiments of the present invention is shown. In an embodiment, a device having an RF transmitter and associated with a driver communicates its physical location to an application server at 160. At 164, a rider sends a verification photo of all vehicle occupants to the application server from the GPS coordinates corresponding to a validation point. At 168, the application server determines the number of occupants that are present in the vehicle in the verification photo. At 172 the application server determines if the number of occupants satisfies the reward criteria. At 176 the application server sends a determination regarding satisfaction of reward criteria to the appropriate regulatory authority, transportation authority or other authorized entity, the rider, and the driver. The regulatory authority, transportation authority, or other authorized entity may then issue a certificate or any other verification acknowledgement instituted for use by the issuing authority that the reward will be provided to a person associated with the vehicle, where the person associated with the vehicle may include a driver, a rider, or other authorized person such as, in a non-limited example, the owner of the vehicle.

Figure 5:
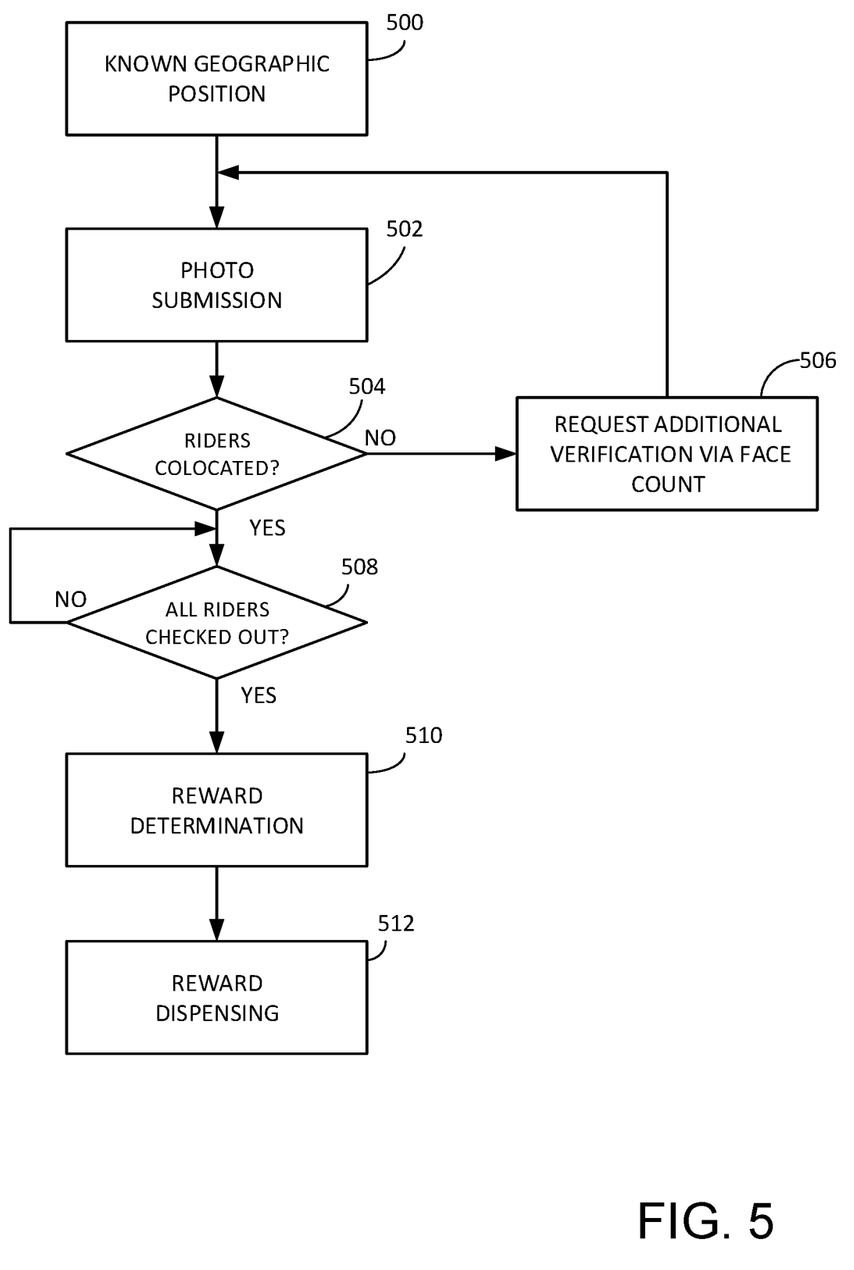
FIG. 5 is a process flow diagram for the determination of sufficiency of award criteria using one or more mobile device digital images and communication of the same by server operation consistent with certain embodiments of the present invention.

Turning now to FIG. 5, a process flow for an alternate determination of award criteria consistent with certain embodiments of the present invention is shown. In an embodiment, a smart device having a processor and an RF transmitter and associated with a driver communicates its physical location to an application server at 500. In an embodiment, the FaceCount system process adds riders to the count of individuals co-located within a vehicle via the driver phone at the start of the trip. When the driver phone hits a reward location, the reward is requested based on the confirmed number of occupants gathered while the carpool was being formed. In a non-limiting example, a travel authority's policy determines if the "exit photo" is required to confirm the SAME passengers are seen at the end of a trip, and by logical association of both beginning and end, the riders assumed to have been together at the reward point in the middle of the trip.

At 502, a driver of a vehicle records a verification photo of all vehicle occupants that are included in the occupancy of a vehicle passenger compartment for a particular trip. The verification photos are utilized by the RideFlag® server to create a facial signature for each occupant. Photograph capture and facial signature creation may occur at times different from the start of any particular occupancy or carpool trip, with the RideFlag® server active to associate facial signatures with occupants that have been previously captured by the smart device associated with the driver. Thus, at the beginning of a trip individuals may be included in the occupancy of the passenger compartment based upon facial signatures previously captured or newly captured by the smart device associated with the driver prior to any occupancy or trip. Additionally, the RideFlag® server may compare facial signatures for individuals regardless of facial orientation or expression to verify individuals who are involved with a particular trip or occupancy.

At 504, the RideFlag® server determines the number of occupants that are present in the vehicle based upon the count of the number of facial signatures that are in the captured photograph. At 506, if there are individuals for which the RideFlag® server does not have a facial signature either previously captured or newly captured the RideFlag® server may request additional photographs to complete the facial signature head count for any individuals that are in the occupancy of a particular trip but for whom the RideFlag® server does not have a facial signature stored in the verification database managed by the RideFlag® server.

At 508, smart device associated with the driver confirms the current occupancy status for each individual that is included in the occupancy of the passenger compartment. The driver's smart device performs a decrement of the occupants of the passenger compartment utilizing a Face Count procedure each time an occupant leaves the vehicle through a "check out" for each occupant that leaves the vehicle during the trip. The RideFlag® server holds any trip reward determination in abeyance until compliance with a travel authority policy is met. The travel authority policy may mandate that all occupants have been determined to have "tapped out" of the passenger compartment of the vehicle at the termination of the trip, or the travel authority policy may determine that the trip reward level has been met based on a spectrum of frequency of use, where the frequency of use may be as low as compliance 5% of the time all the way up to compliance at 100%, which requires a validated exit photo on every trip, and all levels in between these two limits.

At 510, the RideFlag® server determines if the number of occupants meets one or more reward criteria. Additionally, the RideFlag® server is active to determine if external award criteria are required for a particular trip and if those external award criteria may include, such as, in non-limiting examples, whether the vehicle is properly registered, if the driver is part of a privileged group, if reward granting organizations are providing one or more limited time additional awards, or any other special criteria that may affect the award to be earned and captured. At 512, the RideFlag® server may send a determination regarding satisfaction of reward criteria to the appropriate regulatory authority, transportation authority or other authorized entity, the rider, and the driver, with the caveat that the award may be "whitelisted", or held in abeyance, until confirmation has be completed. Confirmation of award is sent to both any award sponsor authority and to the smart device associated with a driver at the end of any qualifying trip in which all occupants for the journey have been accounted for utilizing the Face Count process. The regulatory authority, transportation authority, or other authorized entity may then issue a certificate or any other verification acknowledgement instituted for use by the issuing authority that the reward will be provided to a person associated with the vehicle, where the person associated with the vehicle may include a driver, a rider, or other authorized person such as, in a non-limited example, the owner of the vehicle.

Figure 6:
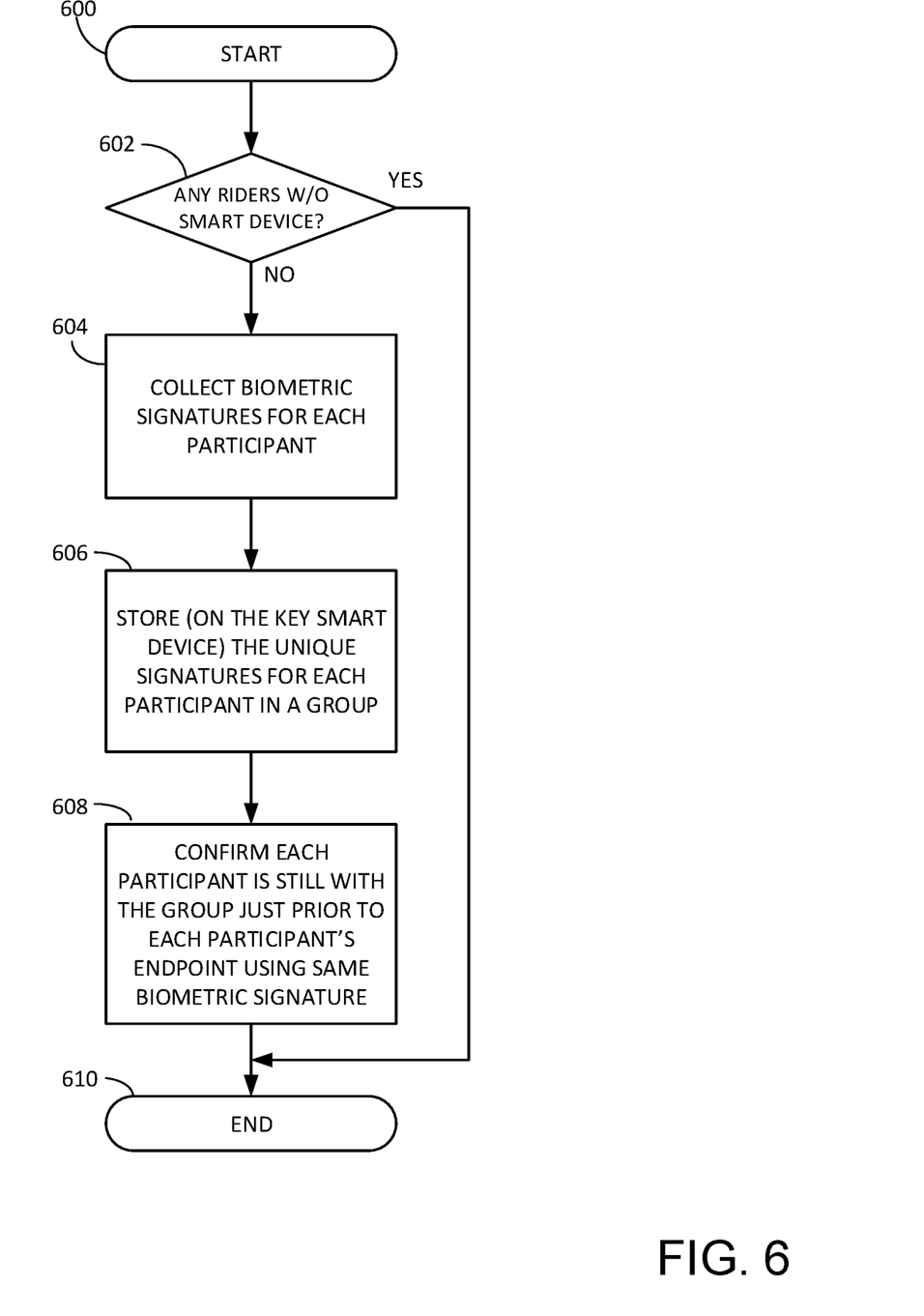
FIG. 6 is a process flow diagram for returning a Probability of Distinction consistent with certain embodiments of the present invention.

Turning now to FIG. 6, a process flow diagram for accounting for occupants of a vehicle who do not have a smart device associated with the occupant during a qualifying journey consistent with certain embodiments of the present invention is shown. At 600, the process begins. At 602, a Determination is made as to whether occupants of a passenger compartment of a vehicle in which a smart device is associated with a driver, but one or more occupants do not have an associated smart device. In a non-limiting example, at 602 the Determination is made based upon the query: are there any riders present in the vehicle who do not possess smart phones or smart devices. If "no," then the process ends at 610. If "yes," then at 604 the system collects for each individual that does not have a smart device associated with the individual, data suitable for biometric analysis, including but not limited to audio, optical, and Infra-Red (IR) data. In a non-limiting example, riders with the app downloaded to a mobile device associated with the rider, the rider's signature may be stored on both their own mobile device and on the RideFlag® server. The system may optionally ask each rider having the application downloaded to check-in utilizing the "ViaFace" function, which requires each rider to look at their mobile device, which will confirm the rider's image matches the pre-established rider profile image.

The server may then confirm that the riders associated with any given vehicle and trip are all distinct from each other and from the driver. This verification eliminates the common cheat of one person travelling with multiple phones, and also allows for each rider to maintain the privacy of only having their image captured on their own mobile device.

At 606 the data is processed for biometric markers, such biometric markers capable of forming a discernable pattern. In an embodiment, unique signatures formed from the processed biometric markers may be stored on the lead smart device for each individual in the group. As a validation capability the RideFlag® server determines and returns the Probability of Distinction, a number or series of numbers representing the likelihood that a pattern resulting from biometric signature data collected from one individual candidate, like a passenger, does not match that of a base pattern from a known individual, such as a driver. This Probability of Distinction presents a separable identification for each member of the group that is participating in a particular trip. At 508, the lead smart device may confirm that each member of the group participating in the trip is still within the group just prior to each member's pre-determined endpoint utilizing the unique signature, composed of the previously described biometric markers, previously determined for each individual member of the group. At 610 the process ends.

Figure 7:
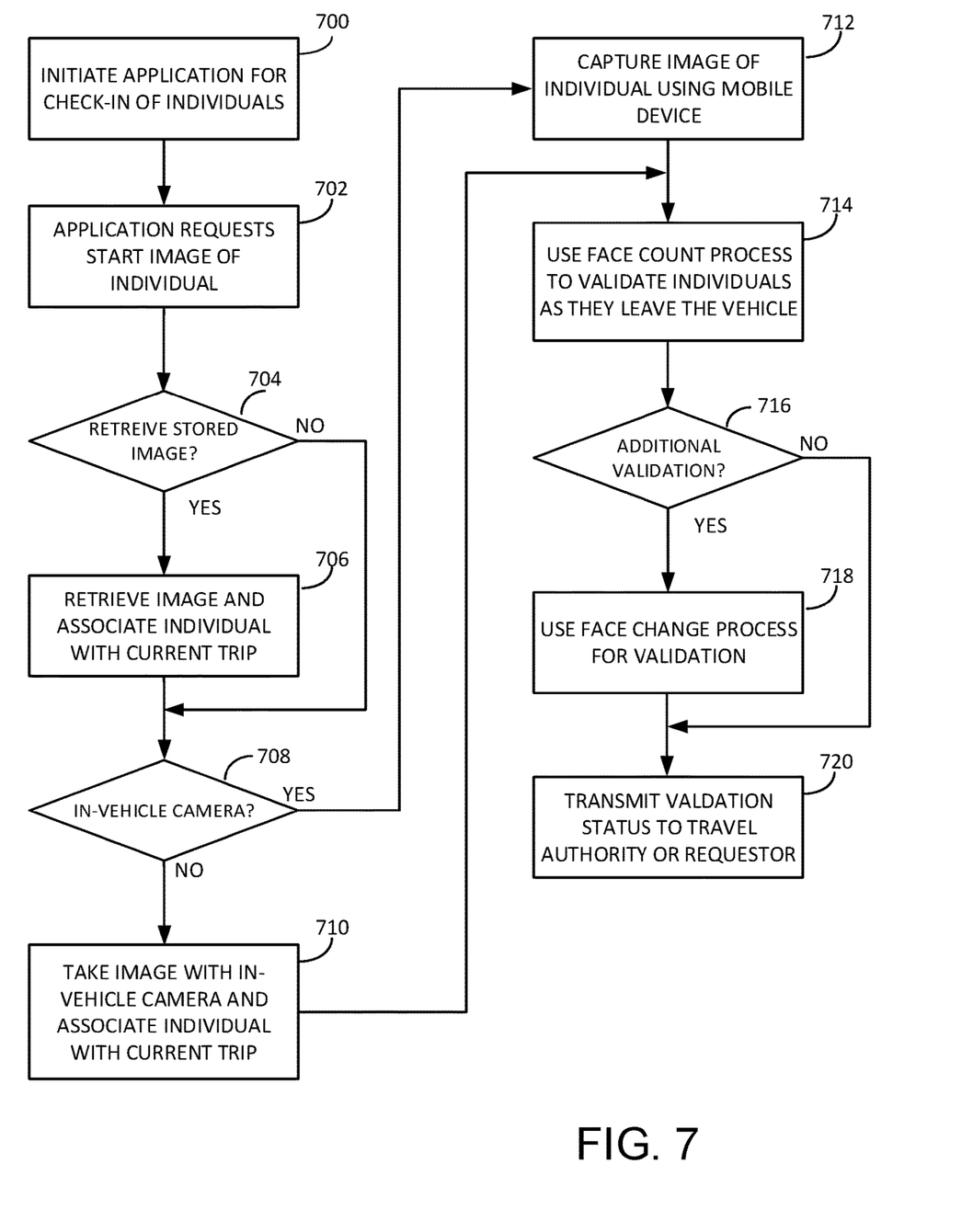
FIG. 7 is a process flow diagram for optimizing image capture and validation consistent with certain embodiments of the present invention.

Turning now to FIG. 7, a process flow diagram for optimizing image capture and validation consistent with certain embodiments of the present invention is shown. Further optimization of the process of validation begins with initiating the RideFlag® application on a mobile devices associated with individuals located in the passenger compartment of a vehicle at 700. Although it is common that the first individual initiating the RideFlag® application is the driver of the vehicle, all individuals physically located within the passenger portion of a vehicle must initiate the RideFlag® application at the beginning of a trip to provide for "check-in" to the validation process. As a part of the "check-in" process, at 702 the RideFlag® application will request an image of the individual associated with the mobile device for the identified vehicle and trip. The trip will be date and time stamped for proper tracking and verification. The RideFlag® application may also provide the individual checking in with one or more options for supplying the image of the individual. At 704, the RideFlag® application provides the individual with the option to retrieve a stored image and supply that stored image as the image for the "check-in" process step. The stored image may be an image stored within the memory of the mobile device or the application may be directed to retrieve the stored image from another data store located external to the mobile device. At 706, the RideFlag® application retrieves the image from the local storage of the mobile device or may send a message to the RideFlag® application server to retrieve the image from external storage and supply it to the RideFlag® application associated with the mobile device. In an alternative embodiment, if the individual is located within the passenger compartment of an autonomous vehicle, of whatever type, that is equipped with one or more cameras that may focus on the passenger compartment, at 708 the individual may capture an image utilizing a camera associated with the autonomous vehicle and at 710 supply that newly captured image to the RideFlag® application. At 712, if the image is not supplied from a previously stored image or captured by a camera associated with an autonomous vehicle, the individual may capture a new image from the camera associated with the mobile device and provide the image captured to the RideFlag® application.

Regardless of the source of the image supplied, each individual in the passenger compartment of the vehicle must supply a "check-in" image to the RideFlag® application at the beginning of a trip. The RideFlag® application is then active to track the presence of individuals within the passenger compartment of a vehicle for the particular trip. The RideFlag® application, at 714, is active to track the portion of the trip in which each individual participates by requiring the capture of an image of the individual as each individual departs the vehicle, presumably at the destination for that individual. At 714, the RideFlag® application utilizes the process steps from the process known as "face count" to compare starting image supplied to the application on "check-in" with the newly capture image when the individual leaves the vehicle, a process known as "check-out", to verify the it is the same individual in both images.

At 716, the RideFlag® application may, in certain circumstances, determine that additional verification is needed to validate that the individual associated with the mobile device is the individual in the starting image for the trip, and that the individual captured is a "live" individual and that the image is not simply another image retrieved from a stored image file. If this situation occurs, the RideFlag® application at 718 may request that the individual change the expression on their face and capture another image. The analysis of the captured image with the changed expression will still provide the same facial signature if the individual is the same in both the beginning image and the newly captured image. This verification acts as a "proof of life" for the individual and provides for greater assurance that the verification is complete and the validation of the identity of the individual is accurate. Upon completion of the validation process, at 720 the RideFlag® application may transmit the validation status for each individual associated with a particular vehicle for a particular trip to a requestor, travel authority, legal authority, or any other specified authorized user.

While certain illustrative embodiments have been described, it is evident that many alternatives, modifications, permutations and variations will become apparent to those skilled in the art in light of the foregoing description.

We claim:

1. A method of verifying commuter vehicle occupancy, comprising:
   establishing communication between a server and one or more mobile devices;
   determining the physical locations of each of said mobile devices;
   verifying said mobile devices are co-located by determining said co-location is within a pre-determined value for proximity of said mobile devices;
   determining whether said proximity conforms to one or more pre-determined values;
   receiving an image of one or more individuals at the beginning of a trip associated with a particular vehicle where each of said one or more individuals may be associated with any one of said one or more mobile devices;
   tracking the departure of each of said one or more individuals from said particular vehicle as the mobile device associated with said one or more individuals departs from said vehicle;
   verifying the occupation of each of said one or more mobile devices within said vehicle for a particular trip; and
   transmitting a report of the occupation of each of said individuals and said one or more mobile devices to a requestor or authorized entity.

2. The method of claim 1, where proximity conforms to the value of being within a pre-determined distance of an individual identified as a driver of a vehicle.

3. The method of claim 1, where the determination of said proximity of said physical locations is made in part through identification GPS coordinates for the physical location of said one or more mobile devices as being within a pre-set physical boundary that corresponds to a particular vehicle.

4. The method of claim 1, where an image supplied for by an individual may comprise a stored image, a newly captured image on a mobile device, or a newly captured image from any camera having a view of the passenger compartment of said vehicle.

5. The method of claim 1 where the determination of departure of a mobile device from a particular vehicle comprises a geophysical distance separation greater than a pre-determined distance or a notification by a mobile device that the mobile device is exiting the particular vehicle.

6. The method of claim 1 further comprising requesting a live image from an individual associated with any one of the one or more mobile devices when a determination of departure from said vehicle has been made.

7. The method of claim 6 where the request of a live image includes a request for the individual to provide an image with a change of expression prior to capture of the image.

8. A system of verifying commuter vehicle occupancy, comprising:

a server having a processor in wireless communication with one or more mobile devices;

a user interface;

a software module operative to determine the physical locations of said mobile devices;

the server operative to verify the co-location of said mobile devices by determining said co-location is within a pre-determined value for proximity of said mobile devices;

an application installed on each of said one or more mobile devices active to receive an image of one or more individuals at the beginning of a trip associated with a particular vehicle where each of said one or more individuals may be associated with any one of said one or more mobile devices;

said application tracking the departure of each of said one or more individuals from said particular vehicle as the mobile device associated with said one or more individuals departs from said vehicle;

said application verifying the occupation of each of said one or more mobile devices within said vehicle for a particular trip; and said application transmitting a report of the occupation of each of said individuals and said one or more mobile devices to a requestor or authorized entity.

9. The system of claim 8, where proximity conforms to the value of being within a pre-determined distance of the driver of a motor vehicle.

10. The system of claim 8, where the determination of said proximity of said physical locations is made in part through identification GPS coordinates for the physical location of said one or more mobile devices as being within a pre-set physical boundary that corresponds to a motor vehicle.

11. The system of claim 8, where the determination of departure of a mobile device from a particular vehicle comprises a geophysical distance separation greater than a pre-determined distance or a notification by a mobile device that the mobile device is exiting the particular vehicle.

12. The system of claim 8, further comprising a camera operative to deliver digital communications from one or more of said mobile devices to said application;

the application active to transmit digital communications to a server;

the server further determining the vehicle occupancy by analyzing said digital communications.

13. The system of claim 8, further comprising requesting a live image from an individual associated with any one of the one or more mobile devices when a determination of departure from said vehicle has been made.

14. The system of claim 13 where the request of a live image includes a request for the individual to provide an image with a change of expression prior to capture of the image.

* * * * *